(12) United States Patent
Nagata (10) Patent No.: US 8,819,936 B2
(45) Date of Patent: Sep. 2, 2014

(54) METHOD OF MANUFACTURING GEAR

(75) Inventor: Eiri Nagata, Toyoake (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 309 days.

(21) Appl. No.: 13/341,065

(22) Filed: Dec. 30, 2011

(65) Prior Publication Data

US 2012/0177457 A1  Jul. 12, 2012

(30) Foreign Application Priority Data

Jan. 7, 2011 (JP) ................................. 2011-002317

(51) Int. Cl.
*B23P 15/14* (2006.01)

(52) U.S. Cl.
USPC ......... 29/893.35; 29/893.3; 74/458; 148/206; 148/211; 148/319; 409/12

(58) Field of Classification Search
CPC ............ B23P 15/14; B21K 1/30; B23F 17/00
USPC ...................... 29/893.3, 893.35, 605; 74/458; 148/206, 211, 319; 409/12
See application file for complete search history.

(56) References Cited

U.S. PATENT DOCUMENTS

| | | | |
|---|---|---|---|
| 4,865,497 A | | 9/1989 | Faulstich |
| 5,595,613 A | * | 1/1997 | Hatano et al. ................. 148/319 |
| 6,033,496 A | | 3/2000 | Hisano et al. |
| 6,134,786 A | * | 10/2000 | Graupner et al. .......... 29/893.35 |
| 6,315,841 B1 | | 11/2001 | Fisher et al. |
| 6,912,786 B2 | * | 7/2005 | Jinkins et al. .............. 29/893.35 |

FOREIGN PATENT DOCUMENTS

| | | |
|---|---|---|
| DE | 198 02 914 C1 | 4/1999 |
| JP | 59-193214 | 11/1984 |

OTHER PUBLICATIONS

Extended Search Report issued Apr. 17, 2012 in Europe Application No. 12150044.1.
Fritz Klocke, et al., "Hard Gear Finishing with a Geometrically Defined Cutting Edge", Gear Technology, vol. 16, No. 6, Nov. 1, 1999, pp. 24-29.
H. Mallener, et al., "Nitrieren von Zahnrädern als Alternative fur das Einsatzhärten?", HTM Haerterei Technische Mitteilungen, vol. 48, No. 3, May 1, 1993, pp. 166-171.

* cited by examiner

*Primary Examiner* — Richard Chang
(74) *Attorney, Agent, or Firm* — Oblon, Spivak, McClelland, Maier & Neustadt, L.L.P.

(57) ABSTRACT

A method of manufacturing a gear by a skiving process, the skiving process utilizing a cutter including a rotational axis inclined to a rotational axis of a work to be processed into the gear, the skiving process feeding the cutter in a tooth trace direction of a tooth to be formed at the work in a state where the cutter rotates in synchronization with the work, the method includes a surface hardening process for hardening a work surface of the work before the skiving process is performed.

10 Claims, 6 Drawing Sheets

METHOD OF MANUFACTURING GEAR

CROSS REFERENCE TO RELATED APPLICATIONS

This application is based on and claims priority under 35 U.S.C. §119 to Japanese Patent Application 2011-002317, filed on Jan. 7, 2011, the entire content of which is incorporated herein by reference.

TECHNICAL FIELD

This disclosure generally relates to a method of manufacturing a gear by a skiving process.

BACKGROUND DISCUSSION

Figure 1A:
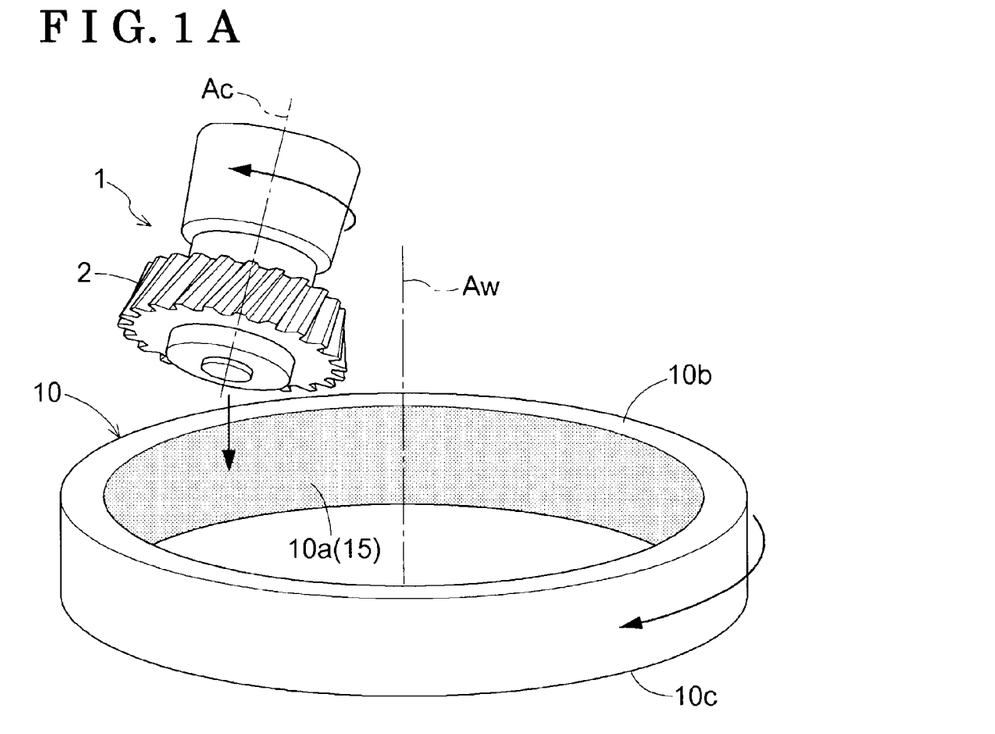
FIG. 1A is an explanation drawing for describing an overview of a method of manufacturing a gear by a skiving process, according to an embodiment disclosed here.
Figure 1B:
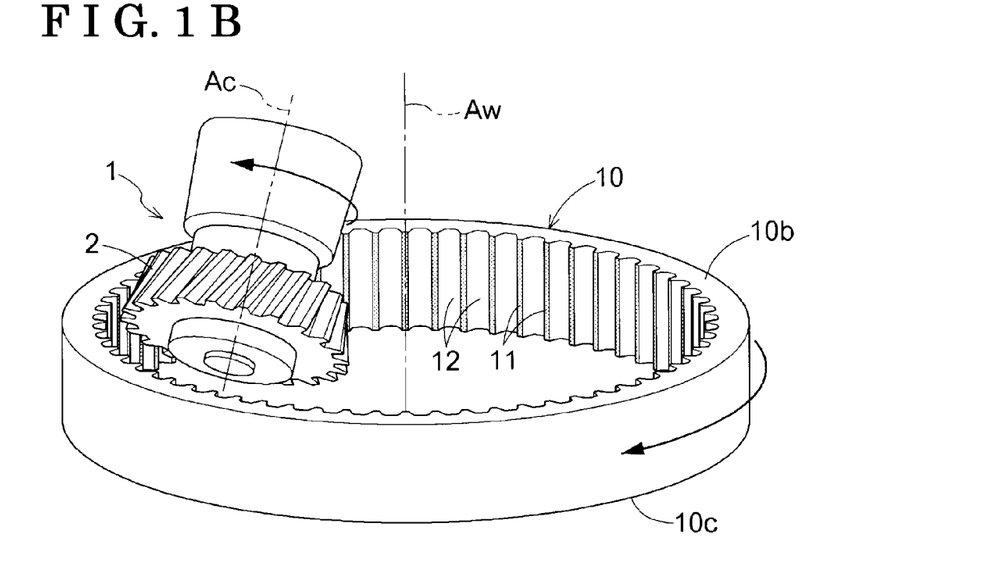
FIG. 1B is an explanation drawing for describing the overview of the method according to the embodiment disclosed here.

A known method of manufacturing a gear utilizes a skiving process. The skiving process will be explained as follows with reference to FIG. 1. While being rotating in synchronization with a work to be processed into the gear, a pinion cutter (hereinafter referred to as a cutter) is fed in a tooth trace direction of each of teeth to be formed at the work. The cutter has a rotational axis inclined relative to a rotational axis of the work. Here, the skiving process is a gear cutting process in which the cutter is fed from an upper side to a lower side along the rotational axis of the work to thereby form the teeth of the gear on a work surface of the work.

In the skiving process, the work is cut by the cutter with slippage generated between the cutter and the work rotating in synchronization with each other; therefore, the work may be smoothly cut by the cutter compared to a case where a work is cut by a simple reciprocating movement of a cutter. In addition, according to the known method, the rotating speed of the cutter is increased in the skiving process; thereby, the work may be easily cut at high speed. Therefore, the skiving process is effective to process the work into the gear (for example, a strain wave gearing) that has multiple minute teeth.

Figure 9:
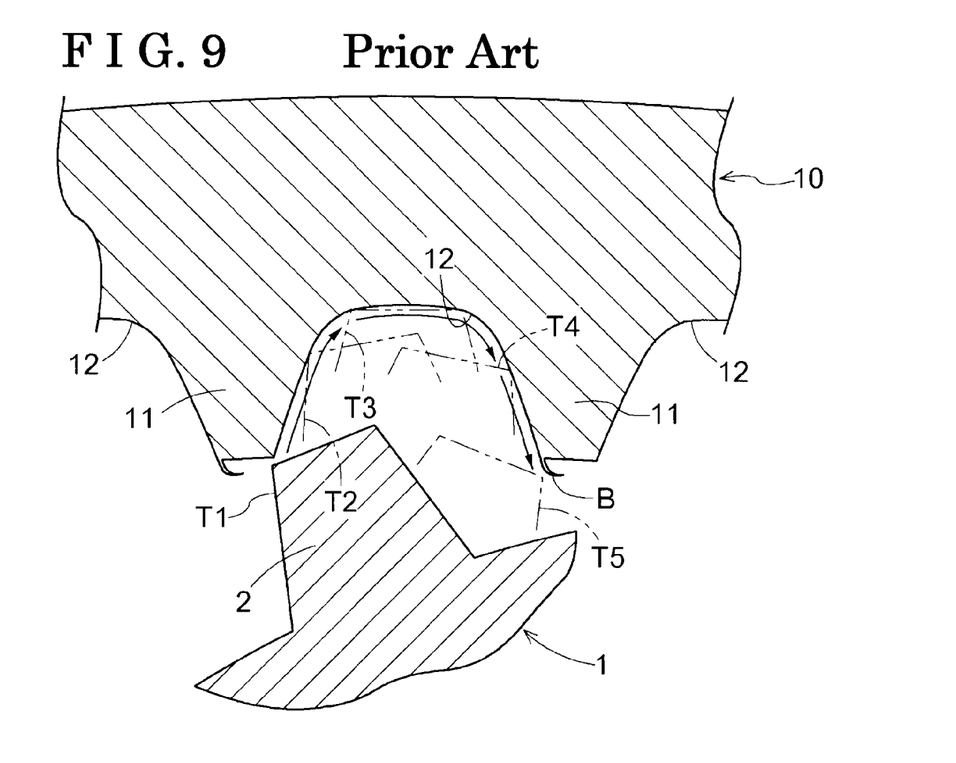
FIG. 9 is a plan view illustrating a process of formation of tooth grooves of a gear by a known method of manufacturing the gear.

In the skiving process, the work is cut by the cutter while being rotated in synchronization with the cutter as described above. Accordingly, for example, as illustrated in FIG. 9, when tooth grooves 12 are being formed at a work 10 (to be processed into the gear) by cutting blades 2 of a cutter 1, each of the cutting blades 2 moves relative to the work 10 from a position T1 through positions T2, T3, and T4 to a position T5. When the cutter 1 rotates from the position T1 to the position T2, from the position T2 to the position T3, and from the position T3 to the position T4, the cutting blade 2 makes contact with the work 10. Thereafter, when the cutter 1 rotates from the position T4 to the position T5, the cutting blade 2 separates from the work 10. During the time when the cutting blades 2 make contact with the work 10 to the time when the cutting blades 2 separate from the work 10, the cutting blades 2 are cutting the work 10.

As illustrated in FIG. 9, during the cutting process of the work 10, a burr B is generated on a work surface of the work 10 in a direction in which the cutting blades 2 separate from the work 10. The rotation of the cutting blades 2 is repeated; thereby, the tooth grooves 12 are formed in the work surface of the work 10. As a result, the multiple burrs B are generated on the work surface along a tooth trace direction of each of teeth 11 to be formed at the work 10. In addition to the burrs B generated by the rotation of the cutter 1, in a case where the cutter 1 separates from the work 10 in accordance with the feed motion of the cutter 1, burrs are generated on a portion of the work surface, the portion being located at a lower side of the feed direction of the cutter 1.

In a general process for manufacturing a gear, a work surface of a work to be processed into the gear is cut by a cutter; thereby, teeth of the gear are formed at the work surface. Afterward, a finishing process or a thermal process is applied to the work surface. At this time, burrs generated on the work surface are removed therefrom. However, in the case of processing the gear such as the strain wave gearing that has the minute teeth, the minute teeth formed at the work surface may be damaged or deformed by the finishing process or the thermal process. Therefore, the finishing process or the thermal process is not often applied to the minute teeth. In such case, the burrs generated when the work is cut by the cutter needs to be minimized.

A need thus exists for a method of manufacturing a gear, which is not susceptible to the drawbacks mentioned above.

SUMMARY

According to an aspect of this disclosure, a method of manufacturing a gear by a skiving process, the skiving process utilizing a cutter including a rotational axis inclined to a rotational axis of a work to be processed into the gear, the skiving process feeding the cutter in a tooth trace direction of a tooth to be formed at the work in a state where the cutter rotates in synchronization with the work, the method includes a surface hardening process for hardening a work surface of the work before the skiving process is performed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment in which a method of manufacturing a gear of this disclosure is applied to a gear cutting process for processing an internal gear, will be described as follows with reference to the attached drawings.

Each of FIGS. 1A and 1B is an explanation drawing for describing an overview of the method according to the embodiment in which a skiving process is utilized. The skiving process will be explained as follows. In the skiving process, while being rotating in synchronization with a work 10 to be processed into the gear, a pinion cutter 1 (hereinafter referred to as a cutter 1) is fed in a tooth trace direction of each of teeth 11 to be formed at the work 10. The cutter 1 includes a rotational axis Ac inclined relative to a rotational axis Aw of the work 10. Here, the skiving process corresponds to the gear cutting process in which the cutter 1 is fed from an upper side to a lower side along the rotational axis Aw of the work 10 to thereby form the teeth 11 at a work surface 10a of the work 10. The work 10 includes an inner circumferential surface having an annular shape. The inner circumferential surface corresponds to the work surface 10a at which the teeth 11 are formed by the skiving process. The work 10 includes upper and lower surfaces 10b and 10c perpendicular to the work surface 10a. The upper surface 10b and the lower surface 10c are located at the upper and lower sides, respectively, in the feed direction of the cutter 1.

Figure 2A:
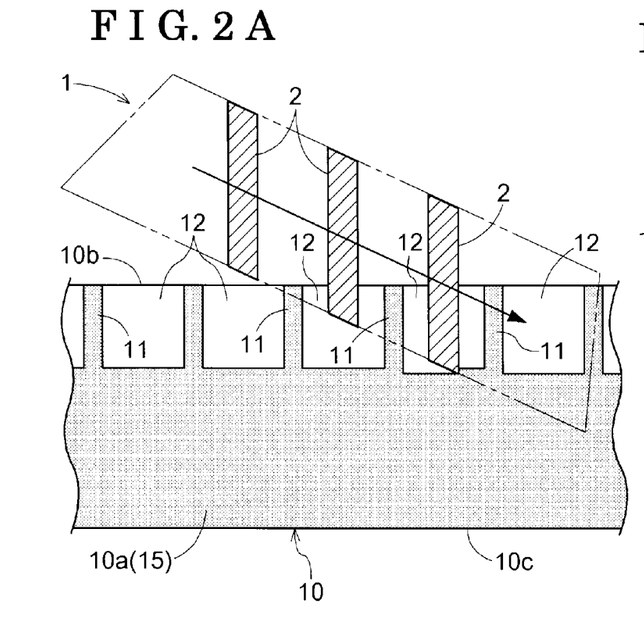
FIG. 2A is a front view of an explanation drawing for describing a cutting process in the skiving process.
Figure 2B:
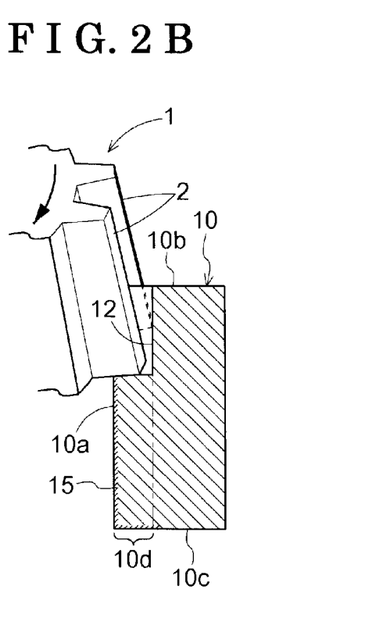
FIG. 2B is a side view of the explanation drawing for describing the cutting process.
Figure 2C:
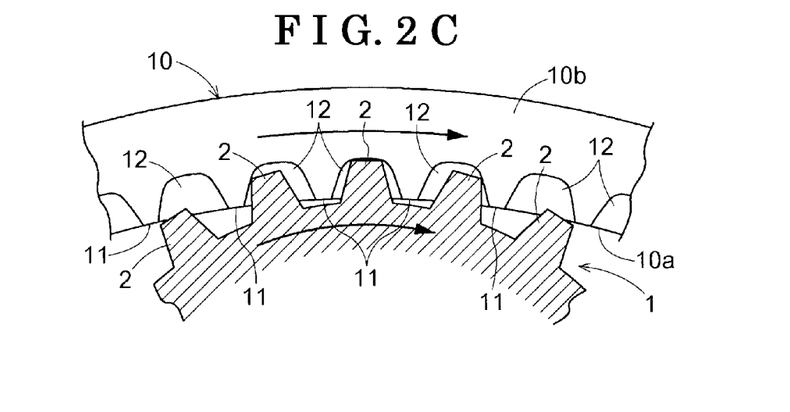
FIG. 2C is a top view of the explanation drawing for describing the cutting process.
Figure 3:
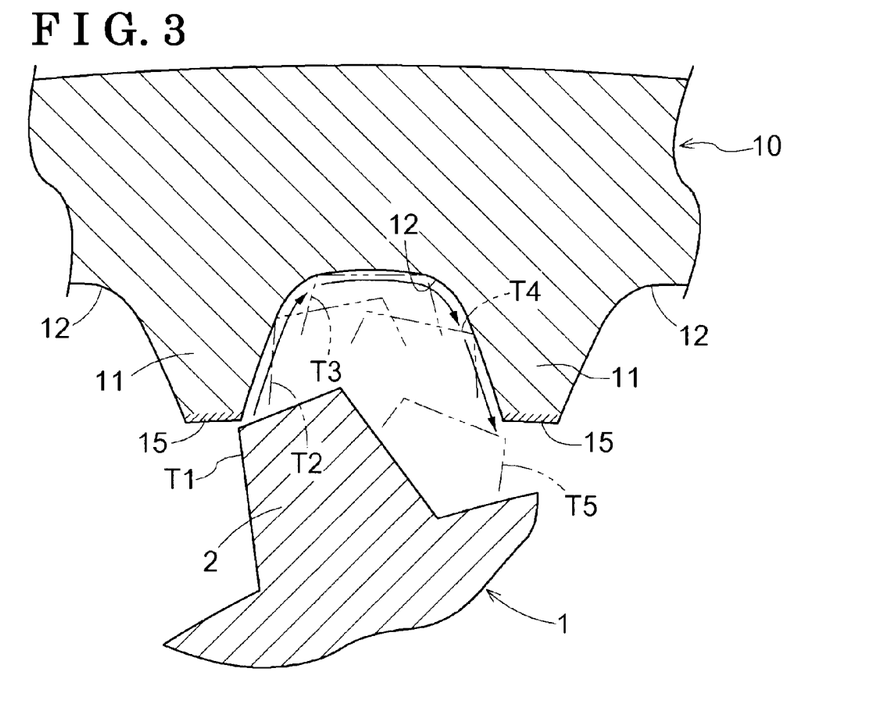
FIG. 3 is a plan view illustrating a process of formation of tooth grooves.
Figure 4:
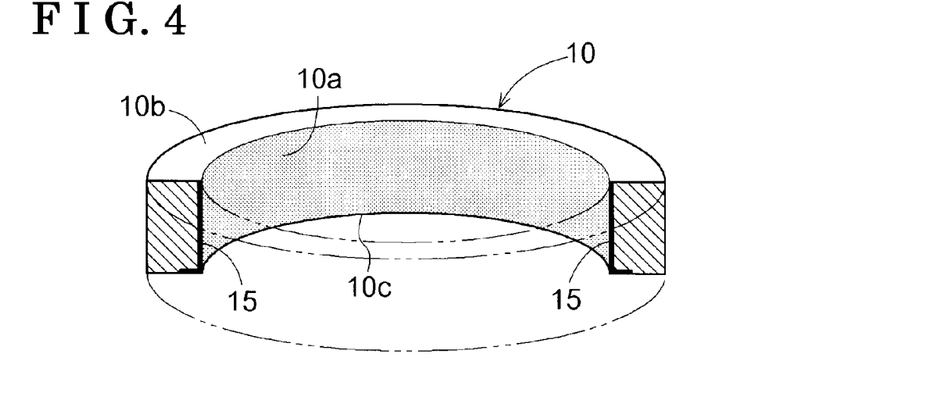
FIG. 4 is perspective view illustrating a work for an internal gear, especially, a portion of the work, the portion being hardened by a surface hardening process.

Each of FIGS. 2A, 2B, and 2C is an explanation drawing for describing a state where the work surface 10a is being cut by cutting blades 2 of the cutter 1 to thereby form tooth grooves 12 in the work surface 10a. FIG. 2A is a front view of the work surface 10a of the work 10. FIG. 2B is a side view of the work surface 10a of the work 10. FIG. 2C is a top view of the work surface 10a of the work 10. FIG. 3 is a plan view illustrating a process of formation of the tooth grooves 12 by the cutting blades 2. The cutter 1 rotates in synchronization with the work 10; thereby, each of the cutting blades 2 moves relative to the work 10 from a position T1 through positions T2, T3 and T4 to a position T5 seen in FIG. 3 to thereby gradually form the tooth grooves 12 in the work surface 10a. As a result, the plural tooth grooves 12 are formed in the work surface 10a as illustrated in FIGS. 2A and 2C.

In a single cutting phase during the time when the single cutting blade 2 makes contact with the work surface 10a to the time when the single cutting blade 2 separates from the work surface 10a, the tooth groove 12, which has a short length in the tooth trace direction, is formed in the work surface 10a. The cutter 1 is further feed while rotating in synchronization with the work 10. Therefore, the tooth grooves 12 are gradually formed in the work surface 10a so as to extend in the tooth trace direction. As a result, the tooth grooves 12 extending from the upper surface 10b to the lower surface 10c are formed in the work surface 10a. A double dashed line in FIG. 2B shows a vertical distance (groove depth) of the tooth groove 12 formed in the work surface 10a as described above. The lower surface 10c includes a portion having an area defined between the work surface 10a and the double dashed line of the vertical distance of the tooth groove 12 in a radial direction of the work 10. The area of the lower surface 10c is defined as a lower-surface cutting area 10d.

For example, in the embodiment, the work 10 is cut by a skiving process according to a known method of manufacturing a gear as illustrated in FIG. 9. In such case, when the cutting blades 2 separate form the work surface 10a of the work 10, burrs B are generated on portions of the tooth grooves 12, the portions being located at the lower side of the feed direction of the cutter 1 (at the lower side of the rotational axis Aw of the work 10). In addition, when the cutter 1 is fed and thereafter separates from the lower surface 10c of the work 10, burrs are generated on the lower-surface cutting area 10d of the lower surface 10c. Therefore, in order to minimize the burrs generated on the portions of the tooth grooves 12 and the lower-surface cutting area 10d in the embodiment, an area of the work 10, which area includes the work surface 10a and the lower-surface cutting area 10d, is face-hardened (such process will be hereinafter referred to as a surface hardening process) before the skiving process is performed. As a result, a surface-hardened layer 15 is formed at the work 10 as illustrated in FIGS. 1A, 2A, 2B, 3A and 4. Thus, the surface hardening process is applied to the work 10 before the skiving process is performed; thereby, the surface-hardened layer 15 becomes brittle. Therefore, turnings generated by the skiving process may be easily detached from the work 10 and the burrs generated by the skiving process may be minimized.

Figure 5A:
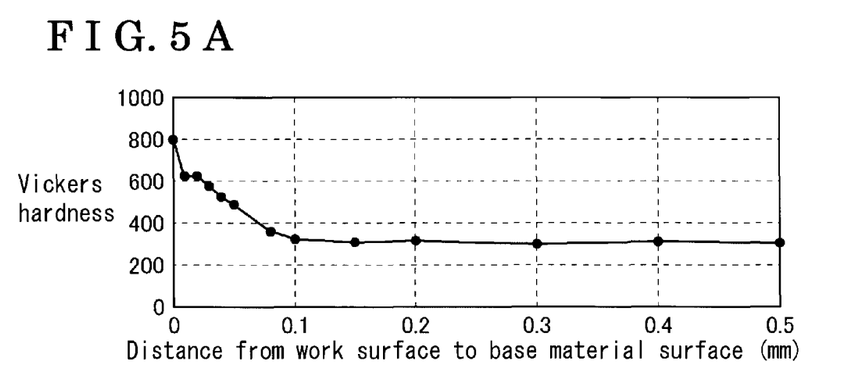
FIG. 5A is a graph illustrating a distribution of Vickers hardness of the work hardened by the surface hardening process.
Figure 5B:
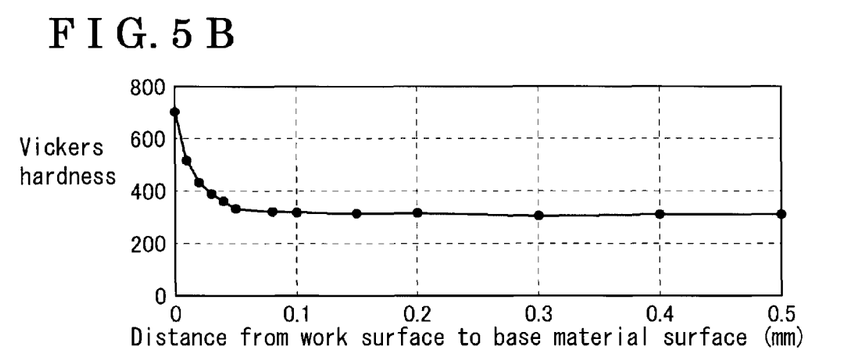
FIG. 5B is a graph illustrating a distribution of Vickers hardness of the work hardened by the surface hardening process.
Figure 5C:
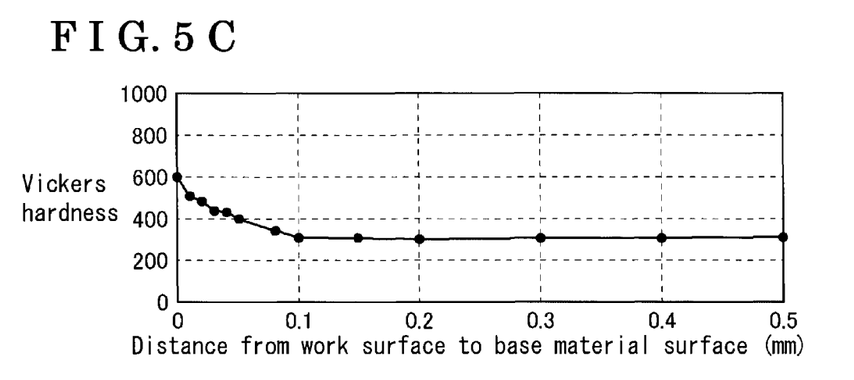
FIG. 5C is a graph illustrating a distribution of Vickers hardness of the work hardened by the surface hardening process.

Each of FIGS. 5A, 5B, and 5C is a graph showing Vickers hardness (HV) of the work 10 face-hardened by a nitriding treatment in a case where a chrome molybdenum steel (SCM435) is applied to the work 10. FIG. 5A is the graph illustrating a distribution of Vickers hardness of the work 10 face-hardened by an ion-nitriding treatment at 400 degrees Celsius for five hours. FIG. 5B is the graph illustrating a distribution of Vickers hardness of the work 10 face-hardened by the ion-nitriding treatment at 400 degrees Celsius for an hour. FIG. 5C is the graph illustrating a distribution of Vickers hardness of the work 10 face-hardened by a radical nitriding treatment at 390 degrees Celsius for two hours.

As seen from FIGS. 5A, 5B, and 5C, hardness of the surface-hardened layer 15 (the work surface 10a hardened by the surface hardening process) is higher than hardness of a base material 14 (see FIG. 7) of the work 10 approximately by 50 to 500 in HV. No hardening treatment is applied to the base material 14. In addition, a thickness D2 (refer to FIG. 7) of the surface-hardened layer 15 is approximately 0.1 millimeter. The thickness D2 is a distance from the work surface 10a hardened by the surface hardness process, to a surface (base material surface) of the base material 14. In a case where the surface-hardened layer 15 has the hardness and the thickness D2 that are up to the aforementioned extent, the burrs generated by the skiving process may be minimized. In addition, wear of the cutter 1 by the surface-hardened layer 15 during the skiving process may be minimized. In the embodiment, the work 10 is face-hardened by the ion-nitriding treatment and the radical nitriding treatment. Alternatively, the work 10 may be face-hardened by other treatments, for example, by carburized quenching, induction hardening, shot peening, and the like. According to the embodiment, the chrome molybdenum steel is applied as a material of the work 10. Alternatively, a different material may be applied as the material of the work 10. According to the embodiment, the thickness D2 of the surface-hardened layer 15 is approximately 0.1 millimeter. Alternatively, the thickness D2 of the surface-hardened layer 15 may be approximately 0.01 millimeter to 0.2 millimeter.

Figure 6:
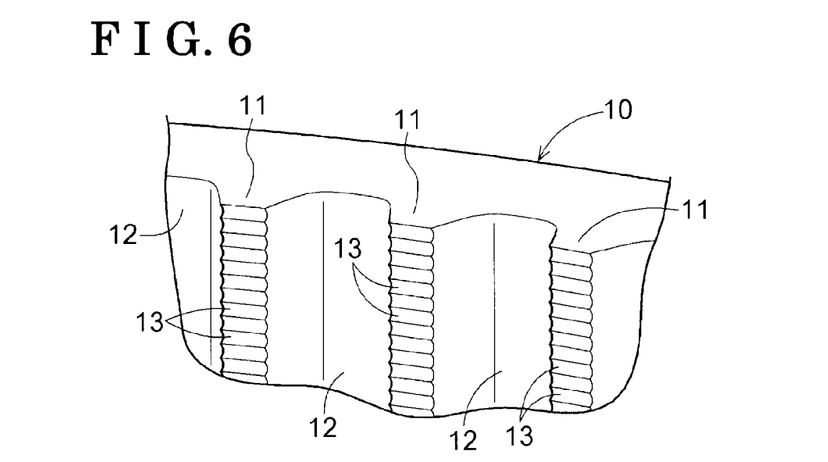
FIG. 6 is a perspective view of minute grooves formed by the cutting process.

FIG. 6 is an enlarged view illustrating the tooth grooves 12 formed by the skiving process, and minute grooves 13 formed by a cutting process that is conducted before the skiving process is performed. Each of the minute grooves 13 includes a depth D1 (see FIG. 7), a deep portion, and a shallow portion. As described above, the minute grooves 13 that are recessed portions are formed in the work surface 10a (in a surface of the work surface 10a hardened by the surface hardening process) and the work surface 10a is thereafter cut by the skiving process to thereby form the tooth groove 12 in the work surface 10a. In such case, the cutting blades 2 of the cutter 1 separate from the work surface 10a in a manner to shift from the deep portions of the minute grooves 13 to the shallow portions of the minute grooves 13. As a result, the turnings having non-uniform shapes are generated and unequal forces act on the turnings; therefore, the turnings may be easily detached from the work 10. Therefore, the burrs generated by the skiving process may be minimized. In addition, according to the embodiment, the minute grooves 13 corresponding to the recessed portions may be bores formed in the work surface 10a in a separated manner.

Figure 7:
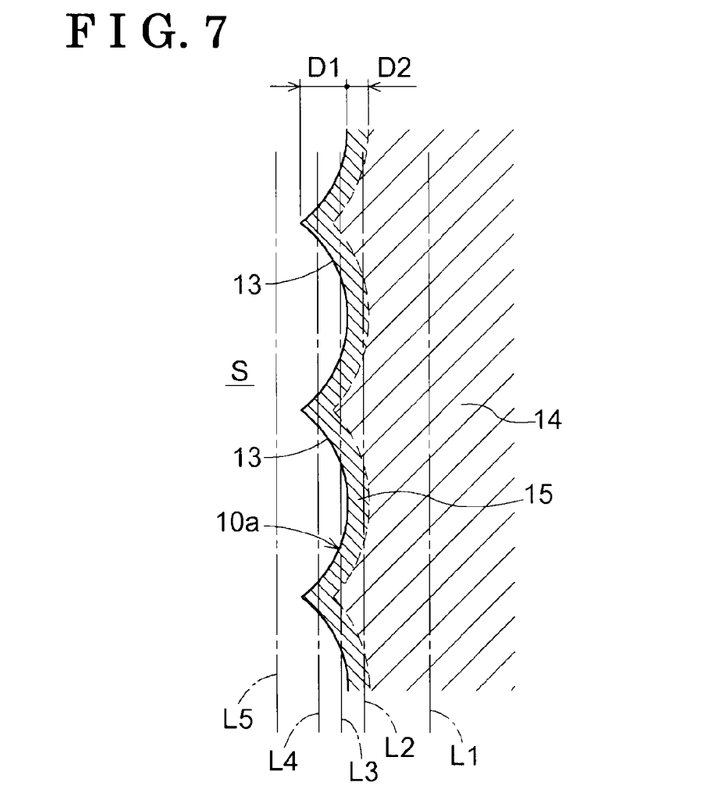
FIG. 7 is a cross-sectional enlarged view of a work surface of the work in which the tooth grooves are not generated.

FIG. 7 is a cross-sectional enlarged view of the work surface 10a in which the tooth grooves 12 are not generated. As illustrated in FIG. 7, it is appropriate for the depth D1 of each of the minute grooves 13 to be larger than the thickness D2 of the surface-hardened layer 15. During the process in which the cutting blades 2 separate from the work surface 10a while the cutter 1 is rotating 360 degrees to cut the work surface 10a by the cutting blades 2, each of the cutting blades 2 shifts from a position L1 through positions L2, L3, and L4 to a position L5 and is thereafter completely separated from the work surface 10a. That is, the cutting blade 2 shifts from the position L1 in which the base material 14 is placed through the position L2 in which the base material 14 and the surface-hardened layer 15 are placed, the position L3 in which the base material 14, the surface-hardened layer 15, and an outer space S of the work 10 are placed, and the position L4 in which the surface-hardened layer 15 and the outer space S are placed, to the position L5 in which the outer space S is placed. Afterward, the cutting blades 2 are completely separated from the work surface 10a. As described above, when the cutting blades 2 separate from the work surface 10a, the turnings having the non-uniform shapes are further generated and the unequal forces further act on the turnings; therefore, the burrs generated by the skiving process may be minimized.

According to the embodiment, the surface hardening process is applied to the work surface 10a and the area of the work 10, which area includes the lower-surface cutting area 10d. However, the burrs may not be generated on the lower-surface cutting area 10d depending on conditions of the feed motion of the cutter 1. In such case, the surface hardening process is not necessarily applied to the lower-surface cutting area 10d and is necessary to be applied only to the work surface 10a.

MODIFIED EXAMPLE OF THE EMBODIMENT

Figure 8:
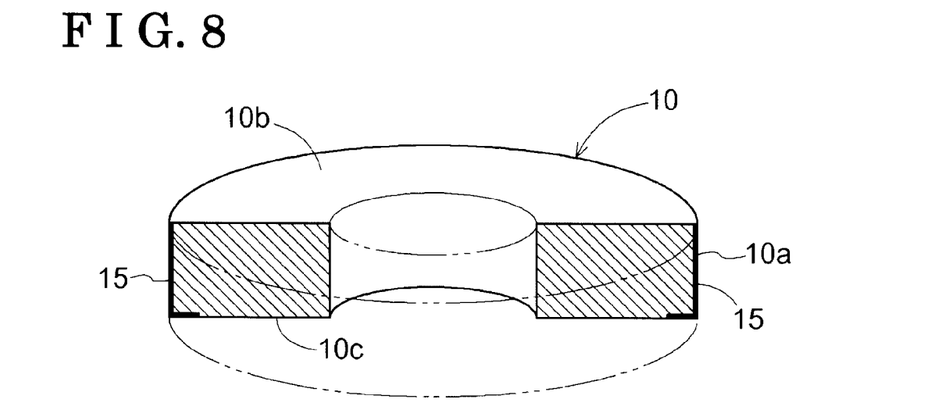
FIG. 8 is a perspective view illustrating a work for an external gear, especially, a portion of the work, the portion being hardened by the surface hardening process.

The method of manufacturing the gear, according to the embodiment is appropriate for manufacturing a strain wave gearing that has multiple minute teeth, by means of the skiving process. Alternatively, the method according to the embodiment may be applied to a process for manufacturing an external gear and the like. FIG. 8 illustrates an example in which the method according to the embodiment is applied to the external gear. In the case of manufacturing the external gear, an outer circumferential surface of the work 10 serves as the work surface 10a. In addition, the lower surface 10c includes a portion having an area in which tooth grooves of the external gear are formed. According to the modified example of the embodiment, the surface hardening process is applied to the work surface 10a (outer circumferential surface) and an area of the work 10, which area includes the portion of the lower surface 10c. As a result, the surface-hardened layer 15 is formed at the work surface 10a and the area of the work 10, which area includes the portion of the lower surface 10c.

As described above, according to the aforementioned embodiment, the method of manufacturing the gear by the skiving process, the skiving process utilizing the cutter 1 including the rotational axis Ac inclined to the rotational axis Aw of the work 10 to be processed into the gear, the skiving process feeding the cutter 1 in the tooth trace direction of the teeth 11 to be formed at the work 10 in a state where the cutter 1 rotates in synchronization with the work 10, the method includes the surface hardening process for hardening the work surface 10a of the work 10 before the skiving process is performed.

According to the method of the embodiment, the work surface 10a is hardened by the surface hardening process before the skiving process is performed; therefore, the work surface 10a hardened by the surface hardening process becomes brittle. Consequently, the turnings may be easily detached from the work 10 and the burrs generated by the skiving process may be minimized. As a result, the burrs are not necessary to be removed from the work surface 10a by a finishing process or a thermal process. Thus, the method according to the embodiment is appropriate for manufacturing the gear such as the strain wave gearing that has the multiple minute teeth.

According to the aforementioned embodiment, the surface hardening process is performed by the nitriding treatment.

The nitriding treatment is a surface hardening method to diffuse nitrogen into a surface of a metal material to create nitrides on the surface to thereby harden the surface. The metal is not necessary to be cooled rapidly in the nitriding treatment as in quenching. Accordingly, the size of the metal material may not be changed by the nitriding treatment. Consequently, the nitriding treatment is appropriate for processing the gear such as the strain wave gearing that has the multiple minute teeth. The surface hardening process by the nitriding treatment is utilized in the method according to the embodiment. Alternatively, other treatments, for example, by carburized quenching, induction hardening, shot peening, and the like may be utilized in the method according to the embodiment.

According to the aforementioned embodiment, the hardness of the work surface 10a hardened by the surface hardening process (the hardness of the surface-hardened layer 15) is higher than the hardness of the base material 14 of the work 10 by 50 to 500 in HV.

For example, in a case where the surface-hardened layer 15 does not have a certain level of hardness or has hardness that is lower than the certain level, the burrs generated by the skiving process may not be minimized by the work surface 10a. On the other hand, for example, in a case where the hardness of the surface-hardened layer 15 is extremely high, the cutter 1 may be easily worn, resulting in a deterioration of precision in processing the gear or in a decrease of a processing speed for the gear. Therefore, as described above, the hardness of the surface-hardened layer 15 is higher than the hardness of the base material 14 approximately by 50 to 500 in HV. As a result, the burrs generated by the skiving process may be minimized and the cutter 1 may be refrained from being worn.

According to the aforementioned embodiment, the thickness D2 of the work surface 10a hardened by the surface hardening process (the thickness D2 of the surface-hardened layer 15) is 0.01 millimeter to 0.2 millimeter.

In a case where the thickness D2 of the surface-hardened layer 15 is extremely small, the burrs generated by the skiving process may not be minimized by the brittle work surface 10a. On the other hand, in a case where the thickness D2 of the surface-hardened layer 15 is extremely large, the cutter 1 may be easily worn, resulting in the deterioration of precision in processing the gear or in the decrease of the processing speed for the gear. Therefore, the thickness D2 of the surface-hardened layer 15 is 0.01 millimeter to 0.2 millimeter as described above; thereby, the burrs generated by the skiving process may be minimized and the cutter 1 may be refrained from being worn.

According to the aforementioned embodiment, the minute grooves 13 are formed in the surface of the work surface 10a hardened by the surface hardening process, by the cutting process for cutting the work 10 before the surface hardening process is performed. Each of the minute grooves 13 has the depth D1 that is larger than the thickness D2 of the work surface 10a hardened by the surface hardening process.

In a case where the minute grooves 13 are formed in the surface of the work surface 10a hardened by the surface hardening process as described above, the cutting blades 2 separate from the work surface 10a in a manner to move from the deep portions of the minute grooves 13 to the shallow portions of the minute grooves 13. As a result, the turnings having the non-uniform shapes are generated and the unequal forces act on the turnings; therefore, the turnings may be easily detached from the work 10. Therefore, the burrs generated by the skiving process may be minimized. In addition, according to the embodiment, the minute grooves 13 corresponding to the recessed portions may be the bores formed in the work surface 10a in a separated manner.

In a case where the minute grooves 13 are formed in the external portion of the face-hardened work surface 10a as described above, each of the cutting blades 2 of the cutter 1 shifts from the position L1 in which the base material 14 is placed through the position L2 in which the base material 14 and the surface-hardened layer 15 are placed, the position L3 in which the base material 14, the surface-hardened layer 15, and the outer space S of the work 10 are placed, and the position L4 in which the surface-hardened layer 15 and the outer space S are placed, to the position L5 in which the outer space S is placed. Afterward, the cutting blades 2 are completely separated from the work surface 10a. Therefore, the turnings having the non-uniform shapes are further generated and the unequal forces further act on the turnings. As a result, the burrs generated by the skiving process may be further minimized.

According to the aforementioned embodiment, the work surface 10a of the work 10 is the inner circumferential surface having the annular shape.

According to the aforementioned embodiment, the material of the work 10 is the chrome molybdenum steel.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A method of manufacturing a gear by a skiving process utilizing a cutter including a rotational axis inclined to a rotational axis of a work to be processed into the gear, the method comprising:
    hardening a first surface of the work by a surface hardening process; and
    feeding the cutter from an upper side to a lower side along the rotational axis of the work in a tooth trace direction of a tooth to be formed at the first surface of the work in a state where the cutter rotates in synchronization with the work,
    wherein the cutter simultaneously cuts the first surface of the work and a second surface of the work which is free of surface hardening.

2. The method according to claim 1, wherein the surface hardening process is performed by a nitriding treatment.

3. The method according to claim 1, wherein hardness of the first surface hardened by the surface hardening process is higher than hardness of a base material of the work by 50 to 500 in Vickers hardness.

4. The method according to claim 1, wherein a thickness of the first surface hardened by the surface hardening process is 0.01 millimeter to 0.2 millimeter.

5. The method according to claim 1, wherein a recessed portion is formed in a surface of the first surface hardened by the surface hardening process, by a cutting process for cutting the work before the surface hardening process is performed, the recessed portion having a depth that is larger than the thickness of the first surface hardened by the surface hardening process.

6. The method according to claim 1, wherein the first surface of the work is an inner circumferential surface having an annular shape.

7. The method according to claim 1, wherein a material of the work is a chrome molybdenum steel.

8. The method according to claim 1, wherein an upper surface of the work is the second surface which is free of surface hardening.

9. The method according to claim 1, further comprising hardening a portion of a lower surface of the work by a surface hardening process prior to the cutting.

10. The method according to of claim 1, wherein the first surface of the work is an outer circumferential surface having an annular shape.

* * * * *